United States Patent [19]
Cahuzac

[11] Patent Number: 5,460,673
[45] Date of Patent: Oct. 24, 1995

[54] METHOD FOR PRODUCING A FIBER REINFORCEMENT FOR A COMPONENT OF COMPOSITE MATERIAL WITH NON-COPLANAR WALLS, AND COMPOSITE COMPONENT COMPRISING SUCH A REINFORCEMENT

[75] Inventor: Georges Cahuzac, Le Bouscat, France

[73] Assignee: Aerospatiale Societe Nationale Industrielle, Paris, France

[21] Appl. No.: 222,321

[22] Filed: Apr. 4, 1994

Related U.S. Application Data

[63] Continuation of Ser. No. 12,458, Feb. 2, 1993.

[30] Foreign Application Priority Data

Feb. 11, 1992 [FR] France .................. 92 01511

[51] Int. Cl.⁶ ............................................ B32B 7/08
[52] U.S. Cl. .................. 156/93; 112/428; 112/440; 156/92; 244/131; 428/102; 428/112
[58] Field of Search .............. 156/93, 92; 52/729, 52/731.7; 428/102, 109, 112, 113; 112/428, 440, 441, 265.1; 244/131

[56] References Cited

U.S. PATENT DOCUMENTS

| | | | |
|---|---|---|---|
| 3,658,612 | 4/1972 | Colzine | 156/93 |
| 3,960,637 | 6/1976 | Ostlow | 52/729 |
| 3,996,084 | 12/1976 | Holmes | 156/93 |
| 4,133,711 | 1/1979 | August | 156/353 |
| 4,177,306 | 12/1979 | Schulz | 52/729 |
| 4,206,895 | 6/1980 | Olez | 156/93 |
| 4,256,790 | 3/1981 | Lackman | 156/93 |
| 4,379,798 | 4/1983 | Palmer et al. | 428/113 |
| 4,413,459 | 11/1983 | Lambuth | 52/729 |
| 4,622,254 | 11/1986 | Nishimura et al. | 428/102 |
| 4,671,470 | 9/1987 | Jonas | 244/131 |
| 4,782,864 | 11/1988 | Abildskov | 244/131 |
| 4,786,541 | 11/1988 | Nishimura et al. | 428/102 |
| 4,863,660 | 9/1989 | Cahuzac et al. | 264/103 |
| 4,906,506 | 3/1990 | Nishimura et al. | 428/113 |
| 4,917,756 | 4/1990 | Cahuzac et al. | 156/429 |
| 4,992,317 | 2/1991 | Chess et al. | 428/102 |
| 5,012,281 | 6/1991 | Bompard | 52/729 |
| 5,019,425 | 5/1991 | Cahuzac et al. | 428/36.1 |
| 5,095,833 | 5/1992 | Darrieux | 112/2 |
| 5,126,190 | 6/1992 | Sakatani | 244/131 |

FOREIGN PATENT DOCUMENTS

| | | |
|---|---|---|
| 0056351 | 7/1982 | European Pat. Off. . |
| 0272083 | 6/1988 | European Pat. Off. . |
| 0284497 | 9/1988 | European Pat. Off. . |
| 0444971 | 9/1991 | European Pat. Off. . |
| 2658841 | 8/1991 | France . |
| 1257691 | 10/1989 | Japan ................. 428/102 |
| WO8002254 | 10/1990 | WIPO . |

OTHER PUBLICATIONS

Webster's II New Riverside Dictionary, Houghton Mifflin Co., 1984, p. 732.

Primary Examiner—Michael W. Ball
Assistant Examiner—Daniel J. Stemmer
Attorney, Agent, or Firm—Fisher, Christen & Sabol

[57] ABSTRACT

Method for producing a fibrous reinforcement (1) for a component of composite material comprising at least two non-coplanar walls, which are for example orthogonal.

According to the invention, at least one first fibrous element (2) is produced as a fiber mat, said first fibrous element (2) is applied via one of its narrow sides (4) against a first face (5) of a second element; and there are inserted, through a second face (7) of said second element (3), on the opposite side to said first face (5), and by the stitching without knotting of a continuous filament (F) by means of a needle, transverse fibers passing through said second element (3).

Production of fiber-matrix composite components.

14 Claims, 6 Drawing Sheets

METHOD FOR PRODUCING A FIBER REINFORCEMENT FOR A COMPONENT OF COMPOSITE MATERIAL WITH NON-COPLANAR WALLS, AND COMPOSITE COMPONENT COMPRISING SUCH A REINFORCEMENT

This application is a continuation of prior U.S. application Ser. No. 08/012,458 filed on Feb. 2, 1993.

BACKGROUND OF THE INVENTION

1. Field of the Invention

The present invention relates to a method for producing reinforcements made of fibers (carbon, glass, boron, etc. . . .) for components of composite material, as well as the reinforcements and composite components obtained by the implementation of said method.

2. Background Art

Numerous methods for obtaining such components of composite material, which consists of a fiber reinforcement embedded in a cured matrix, are known. The first step is to produce a reinforcement of such fibers distributed along at least two directions, after which the material of said matrix is injected into said reinforcement and said material is cured in order to form the matrix.

From European Published Patent Application No. 0,073,648, it is already known to produce such a fibrous reinforcement by assembling, and stitching a plurality of distinct fibrous elements. In particular, with respect to FIG. 9 of the above-mentioned document, a method is described for producing a fibrous reinforcement for a component of composite material which comprises at least two orthogonal walls, according to which method fibrous elements are produced, which respectively represent said walls, one of said fibrous elements is applied against a face of the other fibrous element and said fibrous elements are joined together by stitches.

The technique described in European Published Patent Application No. 0,073,648 has some disadvantages.

First, in order to produce said fibrous elements, it requires webs of fabric which are joined together by lines of stitching, which greatly complicates the production of said fibrous reinforcement.

Furthermore, this technique requires that one of the fibrous elements comprises auxiliary lateral flanges which enable it to bear against said face of the other of said fibrous elements and are necessary for joining these elements. The result of this is that these lateral flanges form areas of additional thickness on said face of the other of said fibrous elements, such areas of additional thickness are a nuisance and influence the mechanical and physical characteristics of said other element.

It will be noted, moreover, that the fibrous element with lateral flanges:

- behaves poorly in bending, particularly around the connection between said flanges and the rest of said elements;
- prevents the other element, against which it is applied and fixed, from having too great a curvature (which prevents for example the production of a component in which said element with lateral flanges would form a stiffener for a dome, formed by the other element);
- prevents the presence of stitches in said fibrous element, in areas other than the flanges of the latter, which creates a heterogeneity.

BROAD DESCRIPTION OF THE INVENTION

The object of the present invention is to overcome these disadvantages. It makes it possible to simplify the production of fibrous reinforcement which comprise non-coplanar walls, such as, ortho-walls, to produce components with a large and to eliminate the said auxiliary joining flanges. It makes it possible, in particular, to produce in a satisfactory manner composite components similar to those made of light metal alloy produced as aircraft structural panels and which comprise plane or curved panels, reinforced by ribs, as well as functional components such as fittings.

For this purpose, according to the invention, the method for producing a fibrous reinforcement for a component of composite material which comprise at least two non-coplanar walls, according to which method first and second fibrous elements are produced, which represent respectively said walls, said first fibrous element is applied against a first face of the second fibrous element and said fibrous elements are joined together, by means of stitches, is noteworthy in that at least said first fibrous element is produced as a fiber mat, in that said first fibrous element is applied via one of its narrow sides against said first face of said second element and in that there is inserted, through a second face of said second element, on the opposite side to said first face, and by the stitching without knotting of a continuous filament by means of a needle, transverse fibers passing though said second element and penetrating into said narrow side of said first element, so that said transverse fibers form said stitches joining said first and second fibrous elements together.

Thus, according to the invention, by virtue of said stitches, the two non-coplanar fibrous elements form a monolithic reinforcement.

In order to provide said first element with good transverse cohesion, which enables it to be handled and stitched without said narrow side bursting, it is advantageous for said fiber mat of said first fibrous element to comprise fibers in a direction at least substantially parallel to the thickness of said fiber mat.

Said first fibrous element can be cut out of said fiber mat, so that the narrow side of said first fibrous element may be adapted to the shape of said first face of said second element, without being subjected to any bending and/or torsional stress.

Advantageously, during stitching, said first fibrous element is held by lateral walls, which reinforces the transverse cohesion action of the fibers in a direction at least substantially parallel to the thickness of the fiber mat and which prevent it from bursting transversely. Such holding walls may be rigid or elastic.

The stitching without knotting of a continuous filament may be easily carried out by using stitching machines described in U.S. Pat. Nos. 4,863,660, 4,917,756 and French Patent No. 2,658,841.

The stitches are distributed over the width and length of said narrow side. For example, these stitches are obtained by means of stitching lines which are parallel (to each other and to the edges of said narrow side) in which a stitch is located halfway between two stitches of an adjacent stitching line. It is advantageous to start by producing the central stitching line, then to stitch lines alternately on either side of said central stitching line thereby moving progressively towards the edges of the narrow side.

The travel of the stitching needle is preferably adjusted so that the stitches penetrate as far as possible into said first fibrous element.

After producing the reinforcement, the matrix material is injected, in any known manner, into the reinforcement thus obtained and said material is cured while said reinforcement is held in the desired final shape.

The figures in the attached drawing will clearly show how the invention can be produced. In these figures, identical references designate similar elements.

Figure 1:
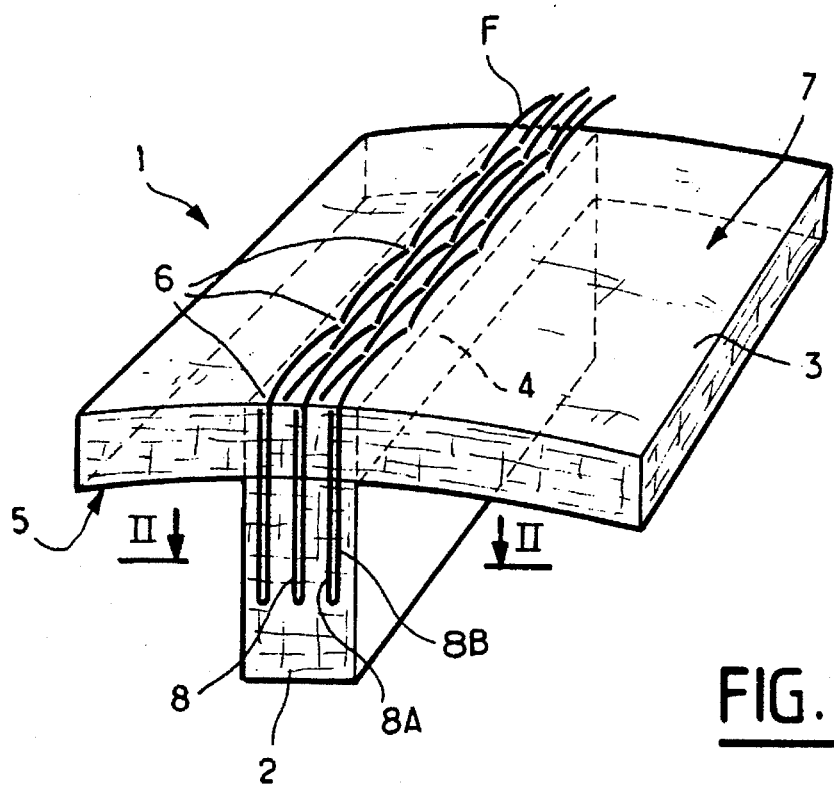
FIG. 1 depicts diagrammatically in perspective a fibrous reinforcement in accordance with the present invention which comprises two orthogonal distinct fibrous elements.

The fibrous reinforcement 1, in accordance with the present invention and represented diagrammatically and partially in FIG. 1, comprises two non-coplanar distinct fibrous elements 2 and 3. In the represented example, these fibrous elements 2 and 3 are orthogonal.

The first fibrous element 2 is applied via its narrow side 4 against the lower face 5 of the second fibrous element 3 and stitches 6 join the fibrous elements 2 and 3 together. The stitches 6 are produced by means of a continuous filament F and of the stitching machine described below, and they pass through the fibrous element 3 via the face 7 of the latter which is on the opposite side to the face 5, and penetrate into the element 2, via its narrow side 4.

Figure 2:
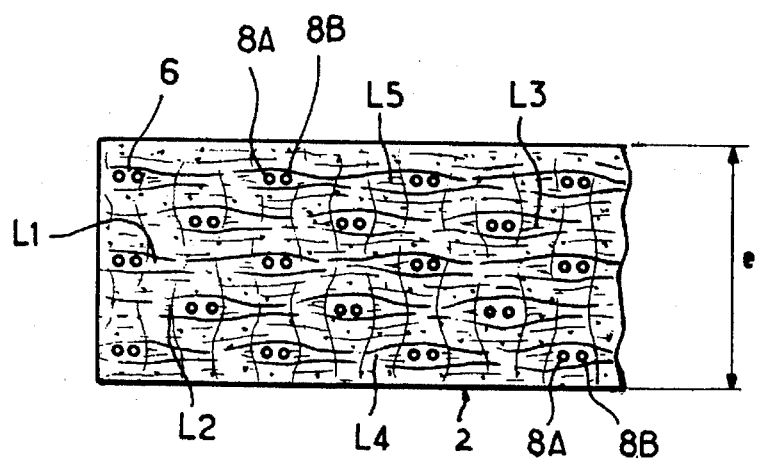
FIG. 2 is an enlarged section along line II—II of FIG. 1.

As is also shown in FIG. 2, each stitch 6 comprises a filament loop 8, the two parallel strands 8A and 8B of which are inserted between the fibers of the elements 2 and 3.

Figure 3:
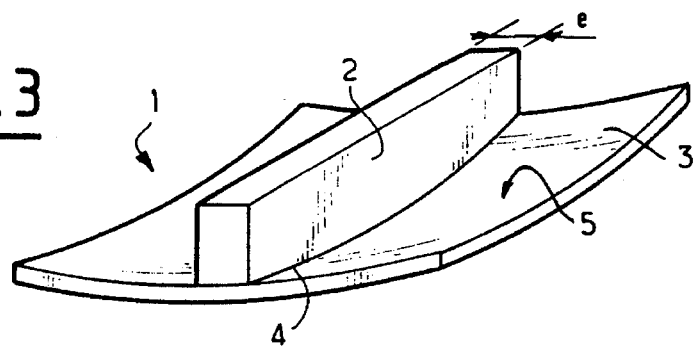
FIG. 3 shows a perspective view from below of a fibrous reinforcement similar to that of FIG. 1.

In order to obtain the first distinct fibrous element 2, the first step is to produce, by any known method, a mat of dry fibers. Said first distinct fibrous element 2 is then cut, in the desired shape, out of this mat (by means of a band saw, a water jet, a laser, etc. . . .). It will be noted that, by virtue of this cutting method, the narrow side 4 of the fibrous element 2 may be adjusted exactly to the shape of the face 5 of the fibrous element 3, so that no bending stress needs to be exerted on said fibrous element 2 in order for its narrow side 4 to correspond exactly in shape to the face 5. This is depicted in FIG. 3, in which it can be seen that the curved narrow side 4 matches the face 5 perfectly, without strain.

The fiber mat, out of which the fibrous element 2 is cut, comprises the constituent fibers which may be arranged in any desired manner according to the characteristics chosen for the reinforcement 1. For example, the fibers may be arranged in an organized manner along several predetermined directions, or else they may be distributed in a random fashion. However, it advantageously comprises transverse fibers (not shown) in a direction at least substantially parallel to the thickness e of said mat. Thus, said fibrous element 2, by virtue of the interfiber friction with the said transverse fibers, holds together well by itself and the cut narrow side 4 exhibits a good surface quality. Furthermore, such transverse fibers help prevent the narrow side 4 from bursting during the insertion of the stitches 6.

Figure 4:
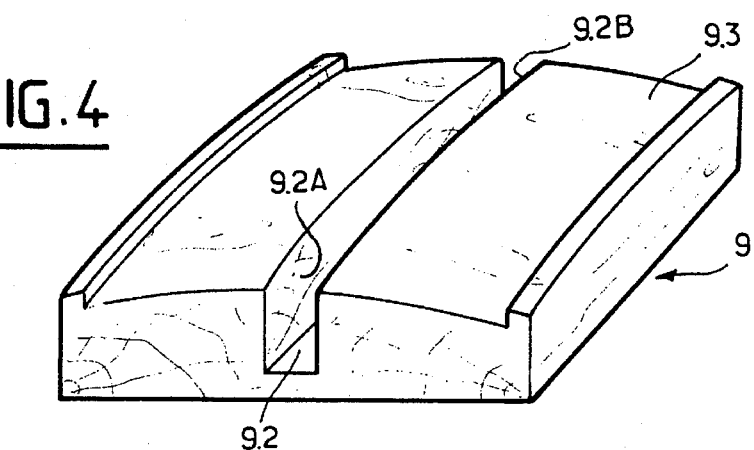
FIG. 4 shows a piece of equipment for producing the fibrous reinforcement of FIG. 3.
Figure 5:
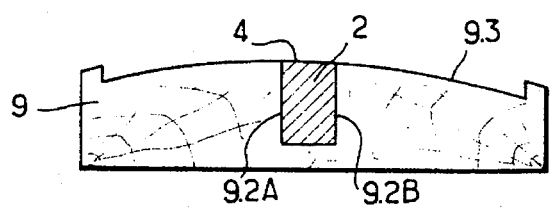
FIGS. 5, 6 and 7 depict the production of the reinforcement of FIG. 3 by means of the piece of equipment of FIG. 4.
Figure 6:
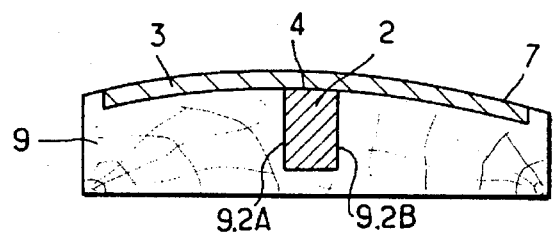
Figure 7:
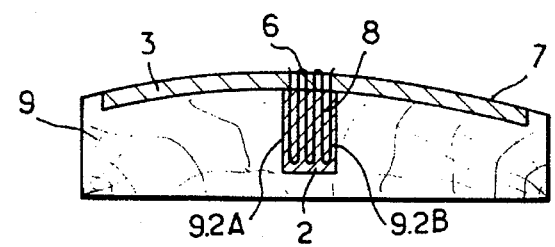

In order to hold the fibrous elements 2 and 3 during the stitching, a rigid former (made of wood or metal for example), provided such as, that represented in FIG. 4, which comprises an impression 9.2 for the fibrous element 2 and an impression 9.3 for the fibrous element 3, which can have any known structure (fabric, fiber mat, etc. . . .). The impression 9.2 is in the shape of a slot having a width which is adjusted to the thickness e of the fibrous element 2, so that the faces 9.2A and 9.2B of said impression 9.2 hold the fibrous element 2, which prevents it from opening during the stitching. The fibrous element 2 is inserted into the impression 9.2, so that its narrow side 4 touches the bottom of the impression 9.3 (FIG. 5). The fibrous element 3 is then positioned in the impression 9.3 (FIG. 6) and the stitches 6 are made (FIG. 7).

Figure 8:
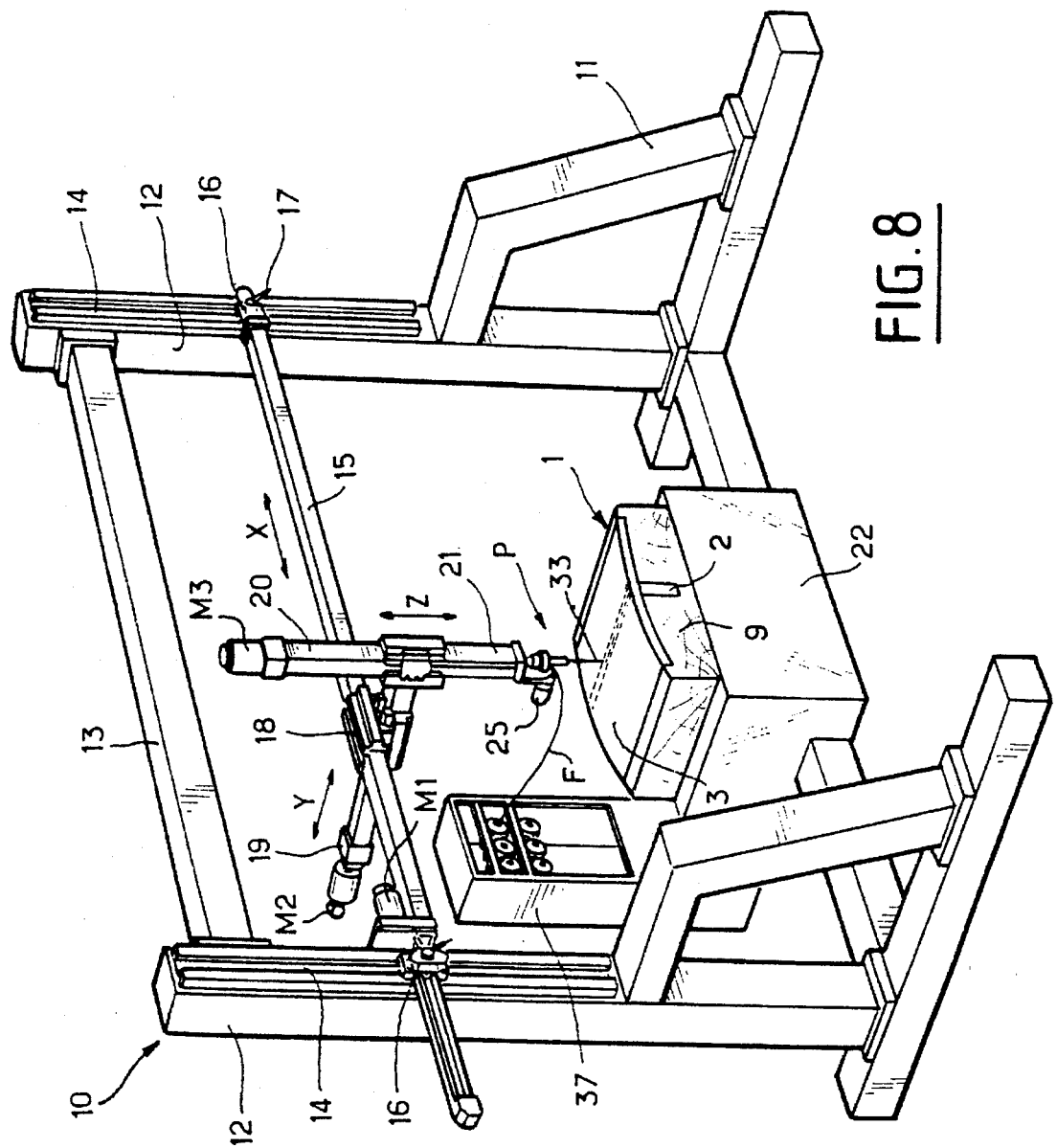
FIG. 8 depicts diagrammatically in perspective a stitching machine for producing the reinforcement of FIGS. 1 and 3.

In order to produce the stitches 6, it is possible to use the machine 10 which does not require the knotting of the filament F, depicted diagrammatically in FIG. 8 and described in more detail in American Patents U.S. Pat. No. 4,863,660 and U.S. Pat. No. 4,917,756.

This machine 10 comprises a frame provided with an underframe 11 and with vertical uprights 12, joined at their upper part by a horizontal crosspiece 13.

Each vertical upright 12 comprises a slideway 14 and a transverse bar 15 which is fixed near its ends in slides 16 mounted in the slideways 14 in which they can be immobilized by screws 17. By virtue of this arrangement, it is possible to adjust the height of the bar 15 on the uprights 12.

A carriage 18 is mounted on the bar 15 and carries a horizontal arm 19 which slides transversely and in an adjustable manner with respect to the bar 15.

At one of its ends, the horizontal arm 19 carries a vertical arm 20 which is also mounted in a sliding and adjustable manner.

Figure 9:
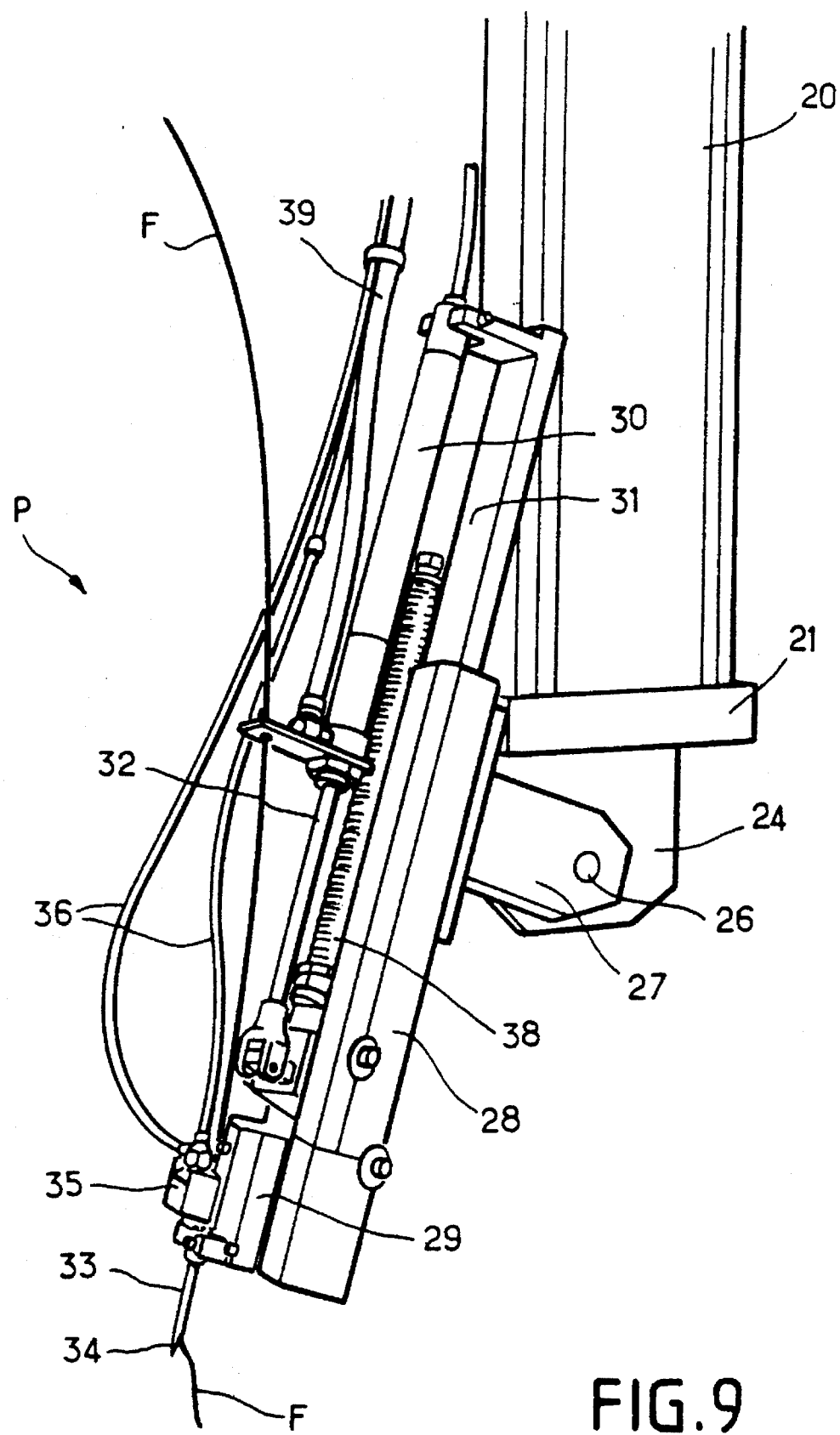
FIG. 9 shows diagrammatically in perspective a stitching device for the machine of FIG. 8.

At its lower end 21, the vertical arm 20 comprises fixing means adapted to receive a stitching device P, which is more clearly visible in FIG. 9.

The machine furthermore includes a base 22, which supports the former 9 in which the elements 2 and 3 are housed in the manner described above, with respect to FIGS. 6 and 7.

It is understood that, by virtue of the arrangement of the bar 15 and of the arms 19 and 20, the end 21 may be adjusted to any desired position with respect to the former 9, along three orthogonal axes X, Y and Z by means of motors M1, M2 and M3 which are represented, by way of example, mounted on the bar 15 and at the ends of the arms 19 and 20 and drive the latter along these three axes via suitable known systems such as rack and pinion, worm or the like.

As seen in FIG. 9, the lower end 21 of the arm 20 comprises a tab 24 fixed as an extension of the arm and on which an electrical motor 25 is fixed, for example, a step motor, the horizontal shaft 26 of which extends through the tab 24.

It will be noted that the stitching device P may be directed in a vertical plane, by the action of the motor 25.

The stitching device P, mounted on the lower end 21 of the vertical arm 20, includes a support 27, fixed to the shaft 26, on which a rail 28 is fixed, a block 29 which slides in the rail 28, a pneumatic jack 30, the cylinder of which is fixed on an extension 31 of the rail 28, joined to the latter and the piston rod 32 of which is connected to the block 29.

The block 29 carries a needle 33, described in detail in the above-mentioned American patents.

The opposite end of the needle to its point 34 is fixed beside a pneumatic filament-gripper of known type 35 mounted on the block 29.

The filament-gripper 35 is connected by conduits 36 to a source of compressed air (not shown) and the fiber filament F, which originates from a source 37, supplies the said needle 33.

A return spring 38 is provided between the block 29 and the rail 28, so that when the jack 30, supplied by a pipe 39, has pushed the block 29 into an extended position and is then set to release, the spring 38 pulls back the block 29 and the needle.

It is noted that, by virtue of the motor M3 and/or jack 30, it is possible to adjust the depth of penetration of the needle 33.

As is described in the two above-mentioned American patents, when the needle 33 is inserted into the elements 2 and 3, the filament F is carried along by said needle through said elements, the filament-gripper 35 being clamped and the travel of the needle being adjusted so as to penetrate into the element 2. As the needle 33 is withdrawn from the element 2, the filament-gripper is unclamped and the needle moves out while progressively releasing the filament F through the elements 2 and 3, thus forming an unclosed loop 8 which is only held back by the fibrous friction in the elements 2 and 3.

Thus, it is by virtue of the pressure exerted by the fibers of the elements 2 and 3 on the loop 8 that, when the needle is withdrawn, the filament F, which passes freely through the needle during this retreat, is held back in order to form the open loop 8.

After having pulled it out of the elements 2 and 3, the needle is moved up above the surface of said elements, by a distance equal to the thickness which is to be stitched plus the stitching pitch, that is to say the spacing desired between two stitches 6.

The filament-gripper 35 is then actuated in order to lock the filament in the needle, the arm 20 moves by one pitch Y, and the device is once again actuated in order to restart the cycle so as to form continuously a large number of loops 8 with the same filament F, that is to say in order to form the stitches 6.

Of course, by acting on the motors M1 and M2, it is possible to bring about any desired relative displacement of the needle 33 with respect to the reinforcement 1, in order to produce the stitches 6.

Thus, the stitches 6 may be produced longitudinal line after longitudinal line, or else in any other manner. If the stitches are produced longitudinal line after longitudinal line, it is advantageous to start with a central stitching line L1, and then to produce the other stitching lines alternately on either side of said central stitching line L1 (L2 then L3, then L4, then L5), as is depicted in FIG. 2. It has been noted that it was advantageous for the stitches in a stitching line to be longitudinally offset with respect to the stitches in the adjacent stitching lines. For this purpose, a stitch 6 in one line may be produced halfway between two stitches in an adjacent stitching line.

The depth of the stitches 6 may be adjusted by virtue of the action of the motor M3, so that the loops 8 penetrate deeply into the element 2 thereby joining the elements 2 and 3 together. Furthermore, the depth of a stitch may be greater the closer said stitch is to the middle of the thickness of the mat 2.

It will be noted that, by virtue of the invention, it is thus possible to avoid using angle-shaped stiffeners. Indeed, in such stiffeners, the bearing flange is used to transmit the forces between the fibrous element 3 and the stiffening flange. In the invention, such a bearing flange can be eliminated, since it is possible to create a sufficient number of stitches 6 so that the assembly of the fibrous elements 2 and 3 can be considered as monolithic.

In addition, it will be noted that, by action of the motor 18, it is possible to adjust the inclination of the needle 33 about the spindle 26 and therefore the inclination desired for the stitches 6. It is therefore easy to be able to incline the loops 8 in the fibrous element 2, if so desired.

The machine 10 of FIG. 8 is diagrammatical and the aim of its description is only to illustrate the present invention and it is of course possible, in order to implement the invention, to use more complex machines, like the example described in the above-mentioned French Patent FR-A-2 658 841.

At the end of the above-mentioned stitching operations, the fibrous reinforcement 1 is obtained, and can be subjected to any known operation for forming a matrix, in order to obtain a composite matrix-fibrous reinforcement component.

Figure 10:
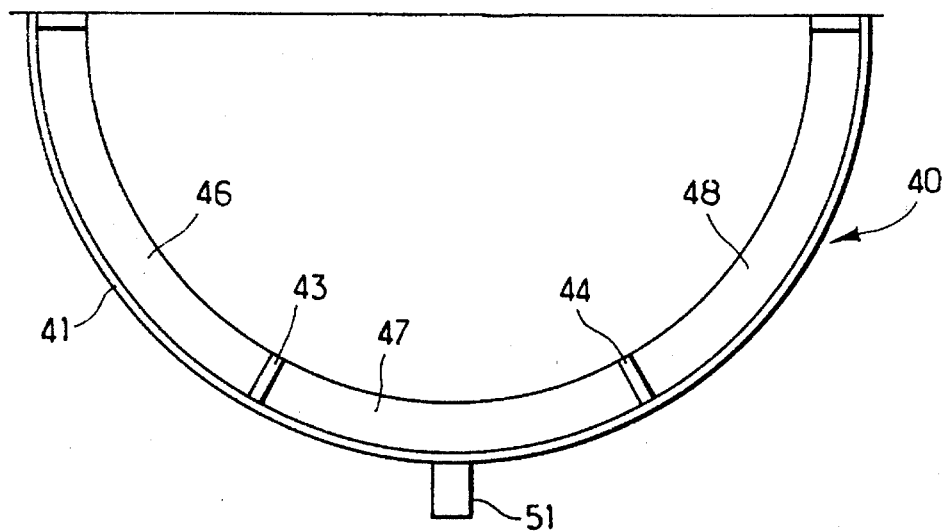
FIGS. 10 and 11 show, respectively in section and in plane view, a shell which can be produced in accordance with the invention.
Figure 11:
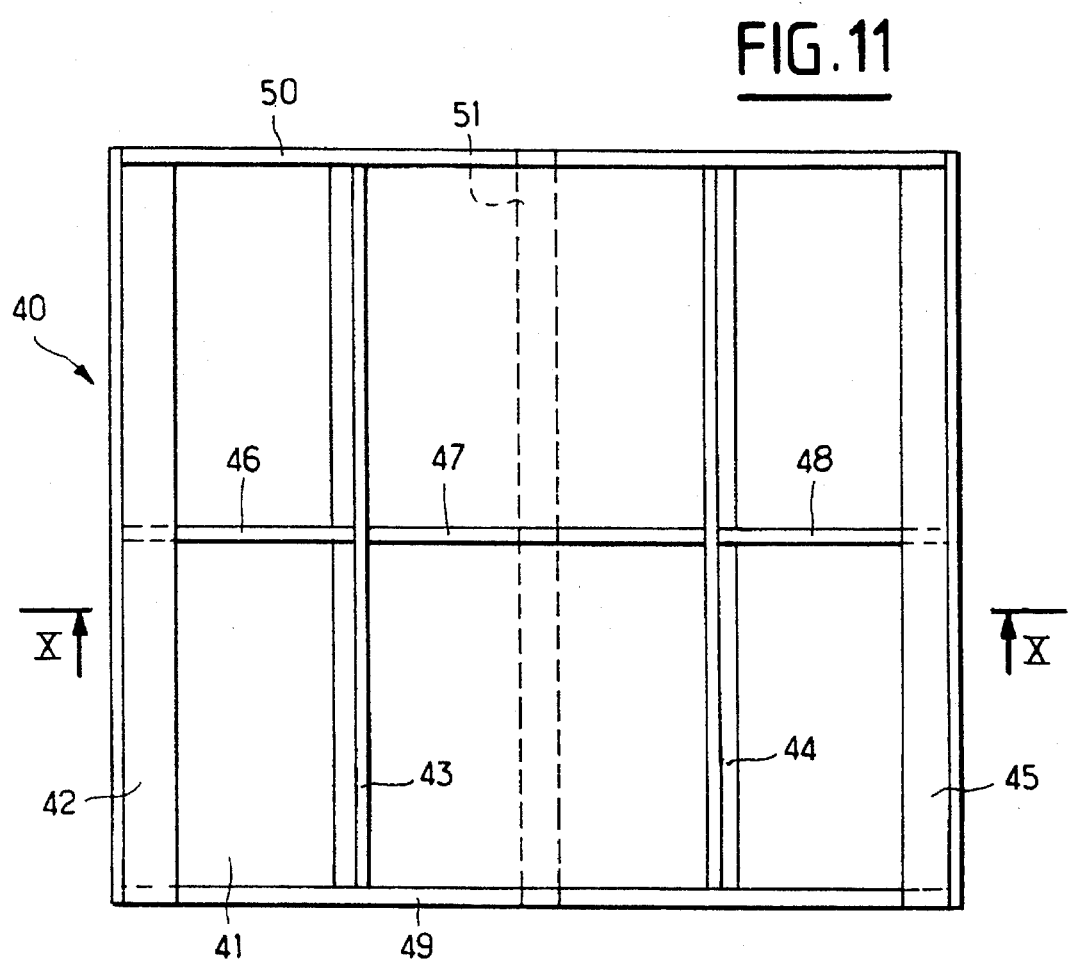

In FIGS. 10 and 11, a non-limiting example depicts a shell-shaped reinforcement 40, capable of being produced in accordance with the invention, in the manner shown in FIGS. 1 to 9.

This shell 40 comprises a fibrous skin 41 (comparable to the fibrous element 3) and a plurality of longitudinal and transverse ribs or the fibrous frames 42 to 51, arranged both on the side of the concavity and on the side of the convexity of the skin 41. Each fibrous element 42 to 51 is comparable to the fibrous element 2 and it is joined to the skin 41 by stitches 6 (not shown).

The shell 40 is represented in a semicylindrical shape, but it goes without saying that it could have any other shape, such as a reactor boat, part an aircraft fuselage or of a ship's hull.

Since the shell 40 has a relatively complicated shape, it may be advantageous to produce its stitching former (not shown but equivalent to the former 9) in a plurality of parts which can be assembled and disassembled.

Figure 12:
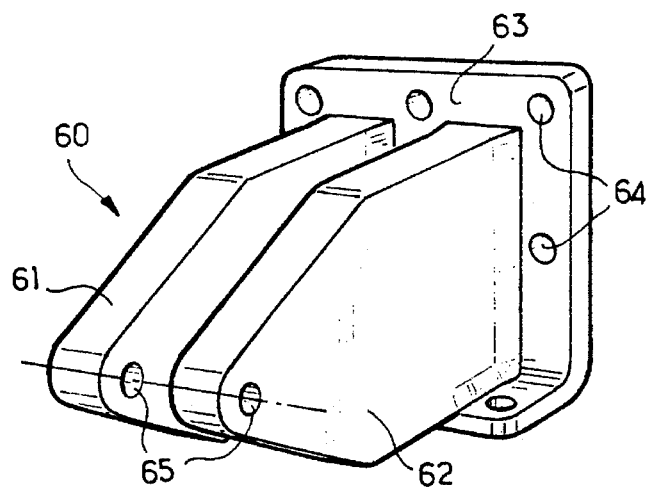
FIG. 12 shows, in perspective, a clevis which can be produced in accordance with the present invention.

In FIG. 12, a clevis of composite material 60 has been represented, which comprises two cheeks 61 and 62 connected to a plate 63. Holes 64 are provided in the plate 63 for fixing the clevis 60, while holes 65 are provided at the free end of the cheeks 61 and 62 for fitting a shaft (not shown).

In order to produce such a clevis 60 in accordance with the invention, the first step is to cut out of a fiber mat elements 66 and 67 (similar to the first element 2) which are inserted into a former 68 with hard rubber spacers 69, 70 and 71, said elastic spacers exerting pressure between them on said elements 66 and 67 in pairs. Furthermore, the former 68 comprises the impression for a fibrous element 72 (similar to the second element 3) which represents the plate 63.

Figure 13:
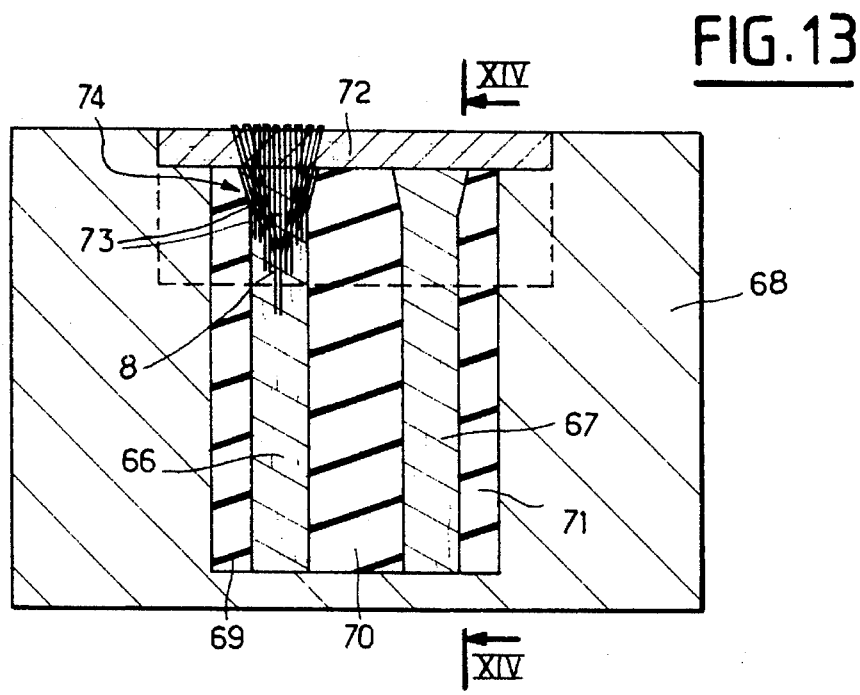
FIGS. 13 and 14 depict diagrammatically the production of the clevis of FIG. 12, in two perpendicular sections.
Figure 14:
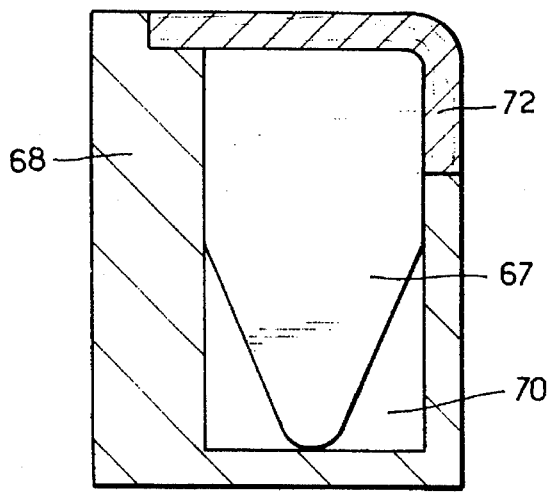

Since the spacers 69, 70 and 71 are elastic, they do not rigidly hold the fibrous elements 66 and 67 during the stitching of the fibrous elements 66, 67 and 72. Consequently, the parts of the fibrous elements 66 and 67, next to the fibrous element 72, tend to swell. This is represented at 74 in FIG. 13 for the element 66. It is then possible to insert, with the machine described above, oblique stitches 73, in addition to the stitches 8.

After stitching the elements 66 and 67 onto the element 72, the reinforcement thus obtained is provided with its matrix, in any known manner and, after the latter has stiffened, the holes 64 and 65 are pierced.

Even though in the examples described above, orthogonal fibrous elements have been shown, it will be easily understood from what precedes that the orthogonality of said fibrous elements is not an essential element of the invention and that the latter applies to non-coplanar fibrous elements regardless of the angle which they form.

I claim:

1. A method for producing a fibrous core for a piece of composite material, said fibrous core comprising:
   a first fibrous panel having at least one narrow side; and
   a second fibrous panel having first and second major surfaces,
wherein said narrow side of said first fibrous panel is applied against said first major surface of said second fibrous panel and joined thereto by needle stitching a continuous, unknotted filament into said second major surface, into said second fibrous panel, through said first major surface, through said narrow side and to and into said first fibrous panel, said first fibrous panel and said second fibrous panel being orthogonal to one another, and said fibrous core lacking auxiliary lateral flanges.

2. The method as claimed in claim 1 wherein said fiber mat of said first fibrous element comprises fibers in a direction at least substantially parallel to the thickness of said fiber mat.

3. The method as claimed in claim 1 wherein said first fibrous element is cut out of said fiber mat.

4. The method as claimed in claim 1 wherein, during stitching, said fibrous element is held by lateral walls.

5. The method as claimed in claim 4 wherein said lateral walls are rigid.

6. The method as claimed in claim 4 wherein said lateral walls are elastic.

7. The method as claimed in claim 6 wherein oblique fibers are inserted into a swollen portion of said first element near said second element.

8. A method for producing a piece of composite material having a T-shaped section, comprising the steps of:
   producing a fibrous core comprising:
      a first fibrous panel having at least one narrow side; and
      a second fibrous panel having first and second major surfaces,
wherein said narrow side of said first fibrous panel is applied against said first major surface of said second fibrous panel and joined thereto by needle stitching a continuous, unknotted filament into said second major surface, into said second fibrous panel, through said first major surface, through said narrow side and to and into the first fibrous panel, said first fibrous panel and said second fibrous panel being orthogonal to one another, and said fibrous core lacking auxiliary lateral flanges;
   then introducing a matrix material into said fibrous core and curing said matrix material, while holding said first and second fibrous panels in the shape desired for said piece.

9. The method as claimed in claim 8 wherein said fiber mat of said first fibrous element comprises fibers in a direction at least substantially parallel to the thickness of said fiber mat.

10. The method as claimed in claim 8 wherein said first fibrous element is cut out of said fiber mat.

11. The method as claimed in claim 9 wherein, during stitching, said fibrous element is held by lateral walls.

12. The method as claimed in claim 11 wherein said lateral walls are rigid.

13. The method as claimed in claim 11 wherein said lateral walls are elastic.

14. The method as claimed in claim 13 wherein oblique fibers are inserted into a swollen portion of said first element near said second element.

* * * * *